United States Patent
Schouler (10) Patent No.: US 11,503,474 B2
(45) Date of Patent: Nov. 15, 2022

(54) TECHNIQUE FOR OBTAINING A NETWORK ACCESS PROFILE

(71) Applicant: ORANGE, Issy-les-Moulineaux (FR)

(72) Inventor: Eric Schouler, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 552 days.

(21) Appl. No.: 16/484,303

(22) PCT Filed: Feb. 6, 2018

(86) PCT No.: PCT/FR2018/050284
§ 371 (c)(1),
(2) Date: Aug. 7, 2019

(87) PCT Pub. No.: WO2018/146408
PCT Pub. Date: Aug. 16, 2018

(65) Prior Publication Data
US 2019/0357038 A1   Nov. 21, 2019

(30) Foreign Application Priority Data

Feb. 9, 2017 (FR) ...................................... 1751068

(51) Int. Cl.
*H04W 12/40* (2021.01)
*H04W 8/20* (2009.01)

(52) U.S. Cl.
CPC ............. *H04W 12/40* (2021.01); *H04W 8/20* (2013.01)

(58) Field of Classification Search
CPC .......... H04W 12/40; H04W 8/20; H04W 8/18
See application file for complete search history.

(56) References Cited

U.S. PATENT DOCUMENTS 7,277,416 B1 * 10/2007 Chang ..................... H04W 8/26
370/338
8,644,218 B1 * 2/2014 Pankajakshan ....... H04W 76/19
370/328

(Continued)

FOREIGN PATENT DOCUMENTS

DE     102014014078 A1   3/2016
EP       2986044 A1       2/2016

OTHER PUBLICATIONS

English translation of the Written Opinion of the International Searching Authority dated Feb. 6, 2018 for corresponding International Application No. PCT/FR2018/050284, filed Feb. 6, 2018.

(Continued)

*Primary Examiner* — Aravind K Moorthy
(74) *Attorney, Agent, or Firm* — David D. Brush; Westman, Champlin & Koehler, P.A.

(57) ABSTRACT

Obtaining a communication network access profile for a first security module associated with a first user device. On receipt of a command for associating the first user device with a subscription with an operator including a second user device associated with a second security module, the second user device sends the first user device a message including a contact address of a server configured to provide by downloading an access profile and a datum allowing the server to interrogate a control server to obtain an order for downloading the access profile. This message triggers sending by the first security module a request for obtaining an access profile associated with the subscription, addressed to the contact address and having the datum. On obtaining an order, the access profile is downloaded into the first security module, a confirmation being sent by the first user device to the second user device.

10 Claims, 2 Drawing Sheets

(56) References Cited

U.S. PATENT DOCUMENTS

| | | | |
|---|---|---|---|
| 9,363,665 B1* | 6/2016 | Burcham | H04W 8/18 |
| 9,942,211 B1* | 4/2018 | Campagna | H04L 63/062 |
| 9,948,641 B2 | 4/2018 | Ahrens et al. | |
| 9,973,583 B2* | 5/2018 | Quiriconi | H04W 4/50 |
| 10,491,612 B2* | 11/2019 | Raman | H04L 63/1416 |
| 10,863,345 B2* | 12/2020 | Schouler | H04W 8/205 |
| 2004/0073785 A1* | 4/2004 | Hurtta | H04L 63/0892 |
| | | | 713/155 |
| 2006/0133317 A1* | 6/2006 | Hurtta | H04W 8/20 |
| | | | 455/432.3 |
| 2009/0177741 A1* | 7/2009 | Tian | H04L 63/102 |
| | | | 709/203 |
| 2015/0163056 A1* | 6/2015 | Nix | H04L 63/101 |
| | | | 380/46 |
| 2016/0301529 A1* | 10/2016 | Park | H04L 63/126 |
| 2016/0330608 A1 | 11/2016 | Benn | |
| 2017/0277898 A1* | 9/2017 | Powell | G06F 21/53 |
| 2017/0347368 A1* | 11/2017 | Juneja | H04W 76/12 |
| 2019/0327605 A1* | 10/2019 | Fan | H04W 12/35 |
| 2019/0364415 A1* | 11/2019 | Gao | H04W 8/20 |
| 2019/0373448 A1* | 12/2019 | Gao | H04W 8/205 |

OTHER PUBLICATIONS

RSP Architecture Version 2.0 Aug. 23, 2016. GSM Association. XP055404424. SGP .21.

RSP Technical Specification Version 2.0 Oct. 14, 2016. GSM Association. SGP.22-v2.0.

International Search Report dated May 4, 2018 for corresponding International Application No. PCT/FR2018/050284, filed Feb. 6, 2018.

Written Opinion of the International Searching Authority dated Feb. 6, 2018 for corresponding International Application No. PCT/FR2018/050284, filed Feb. 6, 2018.

* cited by examiner

TECHNIQUE FOR OBTAINING A NETWORK ACCESS PROFILE

CROSS-REFERENCE TO RELATED APPLICATIONS

This Application is a Section 371 National Stage Application of International Application No. PCT/FR2018/050284, filed Feb. 6, 2018, the content of which is incorporated herein by reference in its entirety, and published as WO 2018/146408 on Aug. 16, 2018, not in English.

FIELD OF THE DISCLOSURE

The invention pertains to the general field of telecommunications.

The invention relates more particularly to a technique for obtaining a communication network access profile for a security module. More precisely, this technique is concerned with a context in which an access profile has already been obtained for another security module, so-called first security module, within the framework of a subscription with an operator. For this subscription, an access profile is required for this security module.

This technique for obtaining an access profile lies in the field of mobile communication terminals, and more particularly of so-called embedded eUICC cards. An embedded eUICC card allows a mobile user device to operate with subscriptions with several operators with one and the same eUICC card which may be non-removable.

BACKGROUND OF THE DISCLOSURE

The GSMA association (for "Global System for Mobile Communications") is developing technical specifications for a card of "eUICC" type (from the English "embedded Universal Integrated Circuit Card") playing the role of a security module, intended to be embedded in a mobile user device. Such a security module may be irremovable and it is then necessary to perform remote actions, for example program it. The GSMA technical specification "SGP.22—RSP Technical Specification" v.2.0 dated 14 Oct. 2016 specifies remote configuration management of an eUICC card (or security module). Thus, when acquiring a new mobile terminal, it is no longer necessary to manipulate the security module beforehand in order to access an operator's network, or indeed to change it upon a change of operator. An access profile corresponds to a set of data and of applications which allow the mobile terminal, once the profile has been activated, to access an operator's network. Provision is made for a user to be able to subscribe directly via a man-machine interface of his user device, or by going to a shop of the operator or/and for him to install an access profile for accessing the network. Provision is also made for him to be able change operator in the same manner.

Accordingly, the user obtains an activation code AC (for "Activation Code") allowing him to contact a server responsible for preparing the subscription management data SM-DP+ (for "Subscription Manager Data Preparation+") so as to download an access profile that has been prepared for him. This activation code comprises in particular an address of the server SM-DP+ to be contacted so as to obtain the access profile and a reference allowing the server to identify this access profile.

For an offer comprising a plurality of security modules, so-called "multi-SIM" offer, a user or a manager of a pool of mobile user devices must connect up to a portal of the operator, authenticate himself, search for his subscription with this operator, ask to add a new user device and then obtain the activation code, for example by scanning it.

This solution is therefore not satisfactory for the user or the pool manager since it requires numerous interactions with the operator's information system.

SUMMARY

One of the aims of the invention is to remedy inadequacies/drawbacks of the prior art and/or to afford improvements thereto.

According to a first aspect, the subject of the invention is a method for obtaining a communication network access profile for a first security module associated with a first user device. This method comprises for a second user device with which a second security module is associated, the second security module having obtained an access profile for accessing the network in conjunction with a subscription with an operator:

on receipt of a command for associating the first user device with said subscription, a sending by the second user device to the first user device, of a message comprising a contact address of a server configured to provide by downloading an access profile and a datum allowing the server to interrogate a control server so as to obtain an order for downloading of the access profile, said message being intended to trigger a sending by said first security module of a request for obtaining an access profile in association with said subscription, the request being addressed to the contact address of the server and comprising said datum allowing said server to interrogate the control server;

a receiving by the second user device from the first user device of a confirmation of downloading of the access profile into the first security module.

Correlatively, the subject of the invention is also a method for obtaining a communication network access profile for a first security module associated with a first user device. This method comprises:

a receiving by a server configured to provide by downloading an access profile, of a request for obtaining an access profile in association with a subscription with an operator originating from said first security module, the subscription comprising at least one second user device with which a second security module is associated, the second security module having obtained an access profile for accessing the network in conjunction with said subscription, the request being addressed to the contact address of the server and comprising a datum allowing said server to interrogate a control server so as to obtain an order for downloading of the access profile;

as a function of the datum received, an interrogating of the control server so as to obtain an order for downloading of the access profile into the first security module;

on obtaining of said order, a downloading of the access profile into the first security module, a confirmation being sent by the first user device to the second user device once the profile has been downloaded.

In a particular embodiment, the method for obtaining a communication network access profile for a first security module associated with a first user device comprises:

a receiving by a server configured to provide by downloading an access profile, of a request for obtaining an access profile in association with a subscription with an operator originating from said first security module, the subscription comprising at least one second user device with which a second security module is associated, the second security module having obtained an access profile for accessing the network in conjunction with said subscription, the request being addressed to the contact address of the server and comprising a datum allowing said server to interrogate a control server so as to obtain an order for downloading of the access profile, the contact address and said datum having been received by the first user device in a message sent by the second user device;

as a function of the datum received, an interrogating of the control server so as to obtain an order for downloading of the access profile into the first security module;

on obtaining of said order, a downloading of the access profile into the first security module, a confirmation being sent by the first user device to the second user device once the profile has been downloaded.

The technique for obtaining a communication network access profile stems from a problem noted for a subscription comprising a plurality of security modules. It is however applicable when the user or the pool manager wishes to modify a current subscription comprising a single security module so as to have the possibility of accessing the network by means of a plurality of security modules. It is also applicable when the user or the pool manager wishes to replace a security module by another security module within the framework of his subscription.

By virtue of this technique, the user or the pool manager can command in a very simple manner a distributing by downloading of an access profile to the first security module within the framework of a subscription comprising the second security module associated with the second user device. Indeed, the user or the pool manager commands this distributing directly from the second user device without needing to interact with a subscriptions management system. It is not necessary for the user or the pool manager to know and to supply a contractual subscription number in order to connect to a portal of the operator managing the subscription. Moreover, no authentication is necessary. In a particular embodiment, this command is performed by means of a man-machine interface offered by the second user device.

Moreover, the technique for obtaining an access profile is applicable to various types of security modules, such as cards of "eUICC" type, chip cards with an operating system offering the functionalities of a card of eUICC type.

The first and second user devices are connected by means of a communication channel. This communication channel is for example a short-range radio or wireless channel, such as a WiFi, Bluetooth, NFC channel, etc. In another exemplary embodiment, the communication channel is carried by a wired link.

The contact address allows the first user device, more precisely the first security module, to contact the server which is responsible for access profile distribution for the communication network operator. It is recalled here that according to the earlier technique a security module obtains this contact address on the basis of an activation code which has been prepared for it. The method for obtaining an access profile such as described previously does not rely on the obtaining of this activation code. Thus, in the absence of this activation code, the first security module obtains the contact address of the server directly from the second user device.

The datum included in the message sent by the security module allows the server, configured to provide by downloading an access profile, to identify the operator managing the subscription and to thus interrogate a control server of this operator. Indeed, the server does not receive any reference allowing it to identify this access profile for this first security module, in contradistinction to the earlier technique. The server must then interrogate a network operator so as to obtain the data necessary for distributing the access profile. The identified control server can then provide in response, if such a downloading is authorized, these data necessary for distributing the access profile.

This technique does not involve the transmission, outside of protected interfaces, of a sensitive identifier, such as the user's access identifier with the network operator. This access identifier is more generally known by the name IMSI (for "International Mobile Subscriber Identity") and makes it possible to uniquely identify the user in the operator's network.

The various embodiments or characteristics of realization mentioned hereinafter can be added independently or in combination with one another, to the method for obtaining an access profile such as defined above.

In a particular embodiment of the obtaining method, the second user device obtains from the second security module the contact address.

Before the implementation of the obtaining method, the second security module has obtained an access profile from the server responsible for distributing access profiles and can thus provide this server's contact address. This simplifies the implementation of the method for the user or the pool manager.

In a particular embodiment of the obtaining method, the second user device obtains from the second security module the datum allowing the server to interrogate the control server.

The second security module, once an access profile has been downloaded, is identified by an access profile identifier ICCID (for "Integrated Circuit Card ID") which is unique. It is thus possible to deduce the datum allowing the server to interrogate the control server on the basis of this identifier ICCID. This simplifies the implementation of the method for the user or the pool manager.

In a particular embodiment of the obtaining method, data associated with an access profile comprise the contact address and the datum allowing the server to interrogate the control server.

The contact address of the server as well as the datum allowing the server to interrogate the control server are for example stored in data of the downloaded access profile. This allows the second security module, which has stored an access profile, to readily provide these data allowing the first security module to obtain its own access profile. A third security module can then also be associated with this subscription by again implementing the access profile obtaining method interchangeably from the first security module or from the second security module.

In a particular embodiment of the obtaining method, the datum allowing the server to interrogate the control server furthermore allows the control server to identify the subscription. By way of illustration, the control server can determine on the basis of the access profile identifier ICCID which is the associated subscription. Thus, the user or the pool manager need not provide a subscription identifier.

In a particular embodiment of the obtaining method, the sent message furthermore comprises a subscription identifier in respect of a subscription with the operator.

In this embodiment, the datum allowing the server to interrogate the control server makes it possible to identify the network operator and the subscription identifier is provided in addition.

According to a second aspect, the invention also relates to a user device, so-called second user device, with which is associated a security module, so-called second security module. This second device comprises:
- a first module, designed to receive a command for associating a first user device with a subscription with an operator comprising at least said second user device, the second security module having obtained an access profile for accessing the network in conjunction with said subscription;
- a command module, designed to send to the first user device a message comprising a contact address of a server configured to provide by downloading an access profile and a datum allowing the server to interrogate a control server so as to obtain an order for downloading of an access profile for a first security module associated with the first device, said message being intended to trigger a sending by said first security module of a request for obtaining an access profile in association with said subscription, the request being addressed to the contact address of the server and comprising said datum allowing said server to interrogate the control server;

said command module furthermore being designed to receive from the first user device a confirmation of downloading of the access profile into the first security module.

This user device can of course comprise in structural terms the various characteristics which relate to the method for obtaining an access profile such as described above and which can be combined or taken in isolation. Thus, the advantages stated in respect of the method for obtaining an access profile according to the first aspect are transposable directly to the user device. Consequently, they are not detailed more fully.

According to a third aspect, the invention also relates to a server configured to provide by downloading an access profile. This server comprises:
- a reception module, designed to receive a request for obtaining an access profile in association with a subscription with an operator originating from a first security module associated with a first user device, the subscription comprising at least one second user device with which a second security module is associated, the second security module having obtained an access profile for accessing the network in conjunction with said subscription, the request being addressed to the contact address of the server and comprising a datum allowing said server to interrogate a control server so as to obtain an order for downloading of the access profile;
- an interrogation module, designed to, as a function of the datum received, interrogate the control server so as to obtain an order for downloading of the access profile into the first security module;
- a downloading module, designed to download the access profile into the first security module on obtaining of an order originating from the control server, a confirmation being sent by the first user device to the second user device once the profile has been downloaded.

In a particular embodiment, the invention also relates to a server configured to provide by downloading an access profile. This server comprises:
- a reception module, designed to receive a request for obtaining an access profile in association with a subscription with an operator originating from a first security module associated with a first user device, the subscription comprising at least one second user device with which a second security module is associated, the second security module having obtained an access profile for accessing the network in conjunction with said subscription, the request being addressed to the contact address of the server and comprising a datum allowing said server to interrogate a control server so as to obtain an order for downloading of the access profile, the contact address and said datum having been received by the first user device in a message sent by the second user device;
- an interrogation module, designed to interrogate the control server so as to obtain an order for downloading of the access profile into the first security module;
- a downloading module, designed to download the access profile into the first security module on obtaining of an order originating from the control server, a confirmation being sent by the first user device to the second user device once the profile has been downloaded.

This server is a server responsible for preparing the subscription management data SM-DP+. The advantages stated in respect of the method for obtaining an access profile according to the first aspect are transposable directly to the server. Consequently, they are not detailed more fully.

According to a fourth aspect, the invention also relates to a system comprising a user device according to the second aspect, so-called second user device, and a server configured to provide by downloading an access profile according to the third aspect. This system furthermore comprises a first user device with which a first security module is associated, forming a first terminal comprising:
- a communication module, designed to receive from the second user device a message comprising a contact address of a server configured to provide by downloading an access profile and a datum allowing the server to interrogate a control server so as to obtain an order for downloading of an access profile for the first security module;
- a profile-obtaining module, designed to send a request for obtaining an access profile in association with a subscription with an operator, the subscription comprising at least the second user device with which the second security module is associated, the request being addressed to the contact address of the server and comprising said datum, and to download the access profile into the first security module; said communication module furthermore being designed to send the second user device a confirmation of downloading of the access profile into the first security module.

The advantages stated in respect of the method for obtaining an access profile according to the first aspect are transposable directly to the system. Consequently, they are not detailed more fully.

According to a fifth aspect, the invention relates to a program for a user device, comprising program code instructions intended to control the execution of those of the steps of the method for obtaining an access profile described above that are implemented by the user device, when this program is executed by this device and a recording medium readable by a server on which a program for a device is recorded.

The advantages stated in respect of the method for obtaining an access profile according to the first aspect are transposable directly to the program for a device and to the recording medium.

According to a sixth aspect, the invention relates to a program for a server, comprising program code instructions intended to control the execution of those of the steps of the method for obtaining an access profile described above that are implemented by the server, when this program is executed by this server and a recording medium readable by a server on which a program for a server is recorded.

The advantages stated in respect of the method for obtaining an access profile according to the first aspect are transposable directly to the program for a server and to the recording medium.

BRIEF DESCRIPTION OF THE DRAWINGS

The technique for obtaining a communication network access profile for a first security module will be better understood with the aid of the following description of particular embodiments, with reference to the appended drawings in which.

DETAILED DESCRIPTION OF ILLUSTRATIVE EMBODIMENTS

Figure 1:
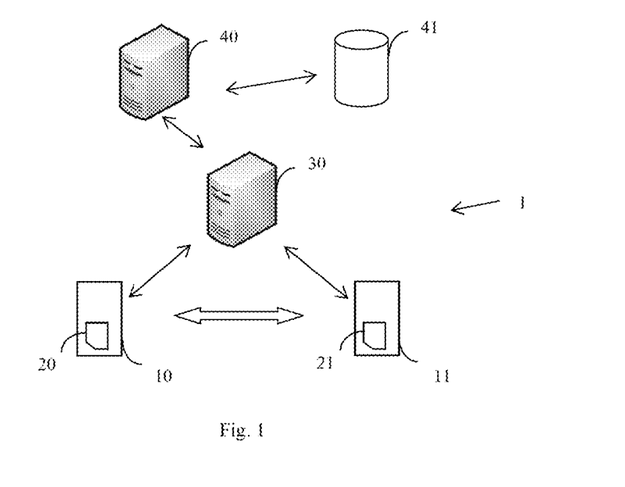
FIG. 1 represents an environment in which the method for obtaining an access profile in a particular embodiment is implemented.

FIG. 1 represents an environment in which the method for obtaining a communication network access profile for a first security module in a particular embodiment is implemented.

Hereinafter in the description, examples are presented of several embodiments applying to a security module of eUICC card type such as undergoing standardization within the framework of the GSMA association, but the method for obtaining an access profile also applies to other types of security module. More generally, the security module is an inviolable dedicated platform, comprising hardware and software, able to securely host applications and their confidential and cryptographic data and providing a secure execution environment for applications, for example a card of UICC type.

The description which follows is concerned with the context of technical specifications, such as are defined by the GSMA association. More precisely, the architecture for remote configuration management is defined in the technical specification SGP.21 "RSP Architecture", version 2.0, dated 23 Aug. 2016 and the procedures are defined in the technical specification SGP.22 "RSP Technical Specification" version 2.0 dated 14 Oct. 2016.

A user device 10, with which a security module 20 is associated, is designed to access the network of a mobile operator by means of an access profile for the network generated by this operator for this security module. The user device 10 in association with the security module 20 form a first mobile terminal. More precisely, the access profile is generated for this security module by a subscription data management server, which is not represented in FIG. 1, linked with the operator. The access profile comprises an application for accessing the network and associated access data (one speaks of "credentials" in English), such as algorithms and cryptographic keys. The access profile once authorized allows access to an infrastructure of a mobile network of this operator. It makes it possible in particular to authenticate the mobile terminal, more precisely the security module 20 upon access to the operator's network. A second user device 11 and its associated security module 21 are also represented in FIG. 1. The user device 11 in association with the security module 21 form a second mobile terminal.

The communication network of the mobile operator, called mobile network, is for example a wireless communication network of 3G or 4G type, such as standardized by the 3GPP. The user devices 10, 11 each comprise a first communication module, designed to access the communication network.

The access profile is identified by a unique number ICCID (for "Integrated Circuit Card ID") making it possible to identify the access profile in a security module.

The security module 20, 21 is typically a card of "eUICC" type (from the English "embedded Universal Integrated Circuit Card"), also called "eSIM" (from the English "embedded Subscriber Identity Module"), or embedded or irremovable SIM card. No limitation is attached to this type of card. In a particular embodiment, the security module 20, 21 is a chip card with an operating system offering the functionalities of a card of eUICC type. In another particular embodiment, the security module 20, 21 is integrated into the user device 10, 11 thus forming a single entity. Each security module 20, 21 is identified by a security module identifier EID (for "eUICC-ID").

In FIG. 1 is also represented a control server 40, for example integrated into the network operator's information system. This control server 40 is designed to coordinate the various configuration operations in the information system and in the operator's network upon a subscription of a new user, a modification of a subscription or else upon obtaining of an access profile. The control server 40 interacts in particular with a server 30 able to provide by downloading to a security module an access profile which has been prepared for it. This server is responsible for preparing the subscription management data SM-DP+(for "Subscription Manager Data Preparation"). The role of this server is to:
prepare profile folders ("Profile Package" in English),
store profile protection keys in a secure manner and protected profile folders in a memory area, and
allocate profile folders as a function of a security module identifier.

The server 30 links a protected profile folder to a security module and downloads, once a secure downloading session has been established, this or these access profiles linked to an LPA (for "Local Profile Assistant") application executing on the user device.

In FIG. 1, there also figures a database 41 accessible by the control server 40. This database 41 is a repository making it possible to store subscription information in respect of this operator.

It is underscored here that for the sake of simplification, other items of equipment in particular responsible for operations and maintenance, for billing, for order taking, . . . are not represented in this FIG. 1. The same holds for items of equipment of the operator's network.

The user devices 10, 11 also comprise a second communication module, allowing them to communicate directly (that is to say without passing through the mobile communication network). The two user devices 10, 11 are thus situated in proximity to one another. A particular embodiment involves a near field communication module, for example an NFC (for "Near Field Communication") module. Another particular embodiment involves a short-range radio communication module of WiFi, Bluetooth type. Yet another embodiment involves a wired communication module.

The various exchanges between the two user devices 10, 11 are carried by a communication channel established by means of the second communication module.

The method for obtaining a communication network access profile for the second security module 21 will now be described in conjunction with FIG. 2.

In the initial state, it is assumed that the user of the user device 10 and of the first security module 20 has taken out a subscription with a communication network operator. In return, he has obtained an activation code AC (for "Activation Code") which has allowed him to install on the first security module 20 an access profile for the network ICCID1. Once the access profile has been installed, the user can access the communication network and the services provided by the operator of the network within the framework of his subscription contract. The first security module 20 has thus obtained an access profile for accessing the network in conjunction with this subscription.

Figure 2:
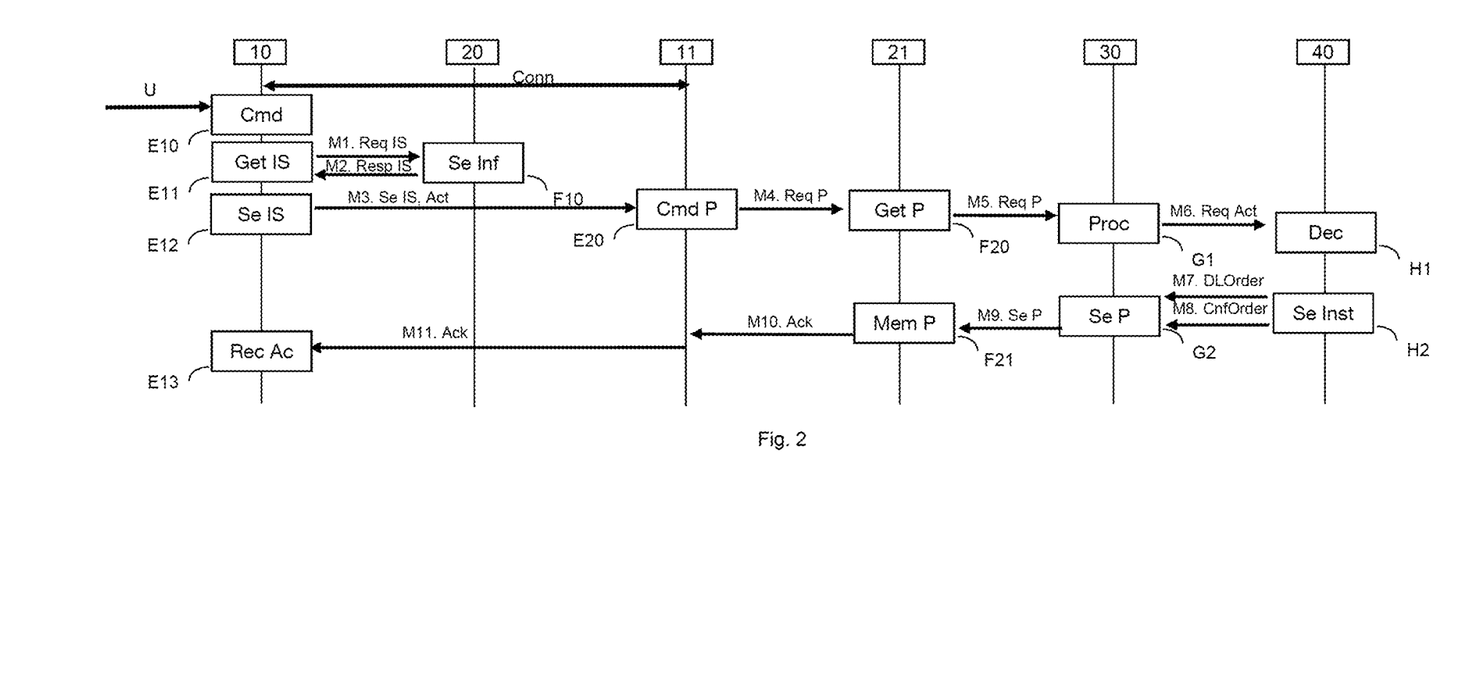
FIG. 2 illustrates steps of a method for obtaining a communication network access profile according to a particular embodiment.

A direct communication channel, represented by an arrow in FIGS. 1 and 2, is established between the first 10 and second 11 user devices.

A user or a pool manager has decided to add the second user device 11, more precisely the second security module 21, to this subscription. In a particular embodiment, the subscription makes it possible to associate a plurality of security modules (so-called "multi-SIM"). In another particular embodiment, the subscription makes it possible to associate a single security module. A modification of the subscription is then required. In another embodiment, the user or the pool manager has decided to transfer access to the network from the first security module 20 to the second security module 21 within the framework of his subscription with the operator. Other cases of usage of this technique for obtaining an access profile can also be envisaged.

This command for association of the second user device 11, more precisely of the second security module 21, can be transmitted by means of a man-machine interface of an application offered by the operator on the first user device 10. No limitation is attached to the way of transmitting this command. In a particular embodiment, this application offered by the operator corresponds to the LPA application. Four choices can be offered in an interaction menu: "add a second security module to my subscription", "subscribe to a multi-security module option on the basis of my current subscription", "transfer my subscription to a new security module", "suspend an access profile".

The first user device 10 thus receives in a step E10 a command for associating the second user device 11 with a subscription with the operator.

In a step E11, through a message M1, the first user device 10, more precisely the LPA application, requests the first security module 20 to provide it with the contact address of the server 30 configured to provide by downloading an access profile, an identification datum and a subscription identifier ID_S. The identification datum allows the server SM-DP+ 30 to determine (in particular when this server SM-DP+ is shared by several operators) and then to interrogate the control server 40 so as to obtain an order for downloading of the access profile, as described subsequently. The datum corresponds for example to an identifier of the operator. The subscription identifier ID_S makes it possible to identify the subscription which is associated with the access profile obtaining request. In an exemplary embodiment, the subscription identifier corresponds to a contract number in the operator's information system. The contract number is for example stored in the access profile by means of an action of personalization of the latter, requiring dynamic generation of the access profile. In another exemplary embodiment, the subscription identifier corresponds to the identifier of the access profile ICCID1 which has been downloaded into the first security module 20.

We are concerned hereinafter with the case where these items of information were provided to the first security module 20 during distribution of the access profile ICCID1 in data associated with this access profile. These data are supplied by the operator. The identification datum may for example correspond to an operator identifier in the data. In another exemplary embodiment, the identification datum corresponds to a field "Service Provider Name" present in metadata associated with the access profile. In another exemplary embodiment, the identification datum corresponds to the pair MCC (for "Mobile Country Code"), MNC (for "Mobile Network Code").

The message M1 is received by the first security module 20 in a step F10. In response, the first security module 20 sends a message M2, comprising the contact address of the server SM-DP+ 30, the identification datum and the subscription identifier ID_S.

In a step E12, the first user device 10, more precisely the LPA application of this device, sends a message M3 to the second user device 11, more precisely the LPA application executing on this second device. This message M3 carries an item of information relating to an action to be executed and comprises in particular the contact address of the server SM-DP+, the identification datum and the subscription identifier ID_S. It is intended to trigger a sending by the second security module 21 of a request for obtaining an access profile in association with the subscription ID_S.

The message M3 is received in a step E20 by the second user device 11, more precisely the LPA application. Still in the course of this step E20, the second user device 11 sends the second security module 21 a message M4, comprising the data received in the message M3, in particular the item of information relating to an action to be executed, the contact address of the server SM-DP+, the identification datum allowing the server SM-DP+ 30 to interrogate the control server 40 and the subscription identifier ID_S. This message M4 commands the second security module 21 to obtain an access profile with the server SM-DP+ 30 whose contact address is provided in the message M4.

The message M4 is received by the second security module 21 in a step F20. Still in this step F20, the second security module 21 sends an access profile request message M5 to the server SM-DP+ 30 by way of the second user device 11. More precisely, as illustrated in FIG. 10 "Common Mutual Authentication Procedure" of technical specification SGP 22 v2.0, this message is sent in a first tunnel established between the user device 11, more precisely the LPA application executing on the user device 11 and the server SM-DP+ 30, relying on a second tunnel established between the security module 21 and the server SM-DP+ 30. It is underscored here that by simplification, FIG. 2 represents a direct relation between the security module 21 and the server SMDP+ 30 whilst the message M5 travels through the user device 11 to reach the server SMPD+ 30. This message M5 is addressed to the server SM-DP+ 30 at the contact address and comprises in particular the action to be executed, the identification datum allowing the server SM-DP+ 30 to interrogate the control server 40, the subscription identifier ID_S and the security module identifier EID, which is associated with the action to be executed. The security module identifier EID corresponds to that of the second security module 21.

This message M5 is received by the server SM-DP+ 30 in a step G1. The server SM-DP+ 30 determines that it does not have the information necessary for distributing the access profile. Indeed, this message M5 does not comprise information allowing the server SM-DP+ 30 to identify an access profile to be downloaded. The server SM-DP+ 30 then sends a message M6 to the control server 40 of the operator identified by the identification datum received. This message M6 comprises in particular the action to be executed, the subscription identifier ID_S and the security module identifier EID. The interface between the server SM-DP+ 30 and the control server 40, called interface ES2+ and defined in the specifications of the GSMA Association, is thus adapted to allow the sending of the message M6, allowing the server SM-DP+ 30 to invoke the control server 40 when no access profile is identified in an access profile request.

The message M6 is received by the control server 40 in a step H1. The control server 40 determines as a function of the action to be executed and of the current subscription, which are received in the message M6, the actions which must be implemented in the operator's information system. These actions are not further detailed here. We are concerned hereinafter with the case where the decision mechanisms implemented by the control server 40 have led to a decision to download, and if relevant to generate, an access profile.

In a step H2, the control server 40 sends a message M7 to the server SM-DP+ 30. More precisely, this message M7 corresponds to a message "ES2+.DownloadOrder" and gives instruction to the server SM-DP+ of a new profile reservation request. This message M7 allows in particular the server SM-DP+ 30 to reserve an access profile whose identifier is ICCID2. The server SM-DP+ processes this instruction in a step G2 by reserving the access profile ICCID2 or by generating it according to the embodiment.

Still in this step H2, the control server 40 sends a message M8 to the server SM-DP+ 30. More precisely, this message M8 corresponds to a message "ES2+.ConfirmOrder" and confirms the order for downloading "ES2+.DownloadOrder". In step G2, the server SM-DP+ 30 downloads the access profile ICCID2 (message M9) onto the second security module 21.

The access profile ICCID2 is received and stored by the second security module 21 in a step F21.

In a particular embodiment, the access profile ICCID2 comprises in data associated with the access profile the contact address of the server 30 configured to provide by downloading an access profile, an identification datum and a subscription identifier. This makes it possible to implement the method for obtaining an access profile for a third security module, either from the first user device or terminal 10 or from the second user device or terminal 11.

Once the access profile ICCID2 has been downloaded and installed, the second security module 21 sends a confirmation (message M10) to the second user device 11 of the execution of the message M4 commanding obtaining of an access profile with the server SM-DP+ 30.

The second user device 11 then sends a confirmation (message M11) to the first user device 10, which receives it in a step E13. This confirmation message is a confirmation of downloading of the access profile ICCID2 into the second security module 21. The first user device 10 can then inform the user or the pool manager thereof by way of his man-machine interface. It is underscored here that the successful installation of the access profile triggers a sending of a confirmation (not represented in FIG. 2) to the server SM-DP+ 30. The latter then sends a message "ES2+.HandleDownloadProgressInfo" to the control server 30 thus informing the operator of the result of the downloading and allowing the latter to continue the processing of the action if relevant.

In the embodiment described, the message M5, addressed to the server SM-DP+ 30 at the contact address, comprises the action to be executed, the identification datum, the subscription identifier and the security module identifier, which is associated with the action to be executed. In another embodiment, the message M5 is a request for obtaining an access profile, comprising the identification datum, the subscription identifier and the security module identifier, which is associated with the action to be executed.

In the embodiment described, the contact address of the server SM-DP+, the identification datum and the subscription datum ID_S have been provided in data associated with the access profile when downloading the latter into the first security module 20.

In another embodiment, only the contact address of the server SM-DP+ is provided in data associated with the access profile when downloading the latter into the first security module 20. The access profile identifier ICCID1 is transmitted in the various messages exchanged in the guise of datum allowing the server SM-DP+ to identify and to interrogate a control server and in the guise of subscription identifier. The server SM-DP+ 30 determines on the basis of the access profile identifier ICCID1 the operator concerned and thus the control server to be contacted. The control server 40 can obtain on the basis of the access profile identifier ICCID1 the associated contract number by interrogating the database 41. This makes it possible to limit the modifications to be made to the access profile.

In another embodiment, the identification datum is obtained by one of the items of equipment (user device 10, 11, server SM-DP+ 30) on the basis of the network-access identifier, known by the name IMSI, in particular on the basis of the fields MCC and MNC.

It is underscored here that the second security module 21 sends a message destined for the server SM-DP+ by way of the second user device 11. At this juncture, no access profile is downloaded nor installed for this second terminal. This second terminal therefore cannot communicate by way of the communication network. In a particular embodiment, the exchanges are effected by means of a communication channel of WiFi type established in a local network. In another embodiment, the first terminal, formed of the user device 10 and of the security module 20, serves as relay toward the server SM-DP+ 30 via the mobile communication network and the exchanges are effected by means of a communication channel established between the first 10 and second 11 user devices.

In a particular embodiment, the subscription identifier ID_S is supplied by the user or the pool manager by means of the man-machine interface of the application offered by the operator on the first user device 10 as a supplement to the association command.

In a particular embodiment, a security code is provided by the user by means of the man-machine interface of an application offered by the operator on the first user device 10. This security code may for example be provided at the same time as the association command. In a variant embodiment, the security code is verified by the security module 20. In another variant embodiment, the security code is transmitted in the various messages M3 (from the user device 10 to the user device 11), M4 (from the user device 11 to the security module 21), M5 (from the security module 21 to the server SM-DP+ 30) and M6 (from the server SM-DP+ 30 to the control server 40). The control server 40 then verifies the security code during step H1. This security code makes it possible to verify that the action has indeed been requested by an authorized user. It is underscored here that this security code may in certain particular embodiments correspond to that of the security module or else that of the user device.

No limitation is attached to these various embodiments and the person skilled in the art is able to define others making it possible to command a downloading of an access profile for a security module from a user device with which is associated another security module with an access profile installed within the framework of a subscription.

Figure 3:
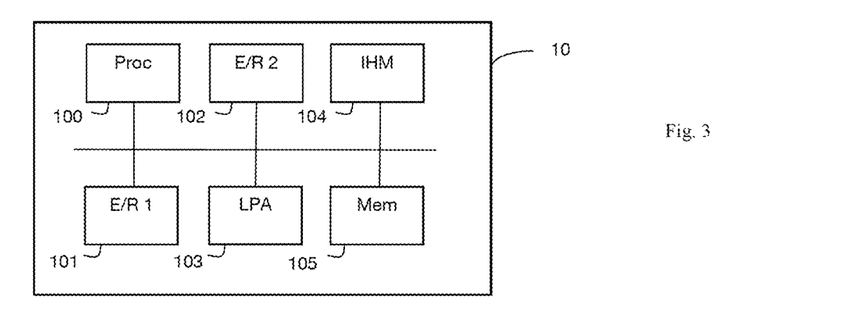
FIG. 3 represents a user device according to a particular embodiment.

FIG. 3 illustrates in a schematic manner a user device 10 in a particular embodiment. A security module 20 is associated with this user device 10. This security module 20 has obtained a communication network access profile in conjunction with a subscription for the user device 10 with an operator. The user device 10 comprises in particular:
- a processor 100 for executing code instructions of software modules;
- a memory area 105, designed to store an application which comprises code instructions for implementing the steps of the method for obtaining an access profile;
- a storage memory, not represented, designed to store data used during the implementation of the obtaining method;
- a first communication module 101, designed to access a communication network;
- a second communication module 102, designed to communicate with a second user device;
- an interaction module 104, designed to receive a command for associating a second user device 11 with this subscription;
- a command module 103, designed to send the second user device a message comprising a contact address of a server 30 configured to provide by downloading an access profile and a datum allowing the server to interrogate a control server 40 so as to obtain an order for downloading of an access profile for a second security module 21 associated with the second device, said message being intended to trigger a sending by said second security module of a request for obtaining an access profile in association with said subscription, the request being addressed to the contact address of the server and comprising said datum allowing said server to interrogate the control server.

The command module 103 is furthermore designed to receive from the second user device a confirmation of downloading of the access profile into the second security module.

In a particular embodiment, the command module 103 is furthermore designed to obtain the contact address of the security module.

In a particular embodiment, the command module 103 is furthermore designed to obtain the datum allowing the server to interrogate the control server of the security module.

In a particular embodiment, the command module 103 is also designed to implement an LPA application.

In a particular embodiment, the interaction module 104 is designed to interact with a user of the user device 10 by way of a man-machine interface.

It is underscored here that the user device 10 also comprises other processing modules, not represented in FIG. 3, designed to implement the various user device functions.

Figure 4:
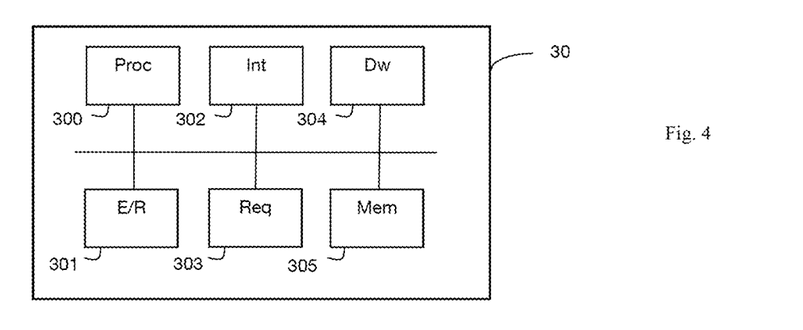
FIG. 4 represents a server according to a particular embodiment.

FIG. 4 illustrates in a schematic manner a server 30 configured to provide by downloading an access profile in a particular embodiment. More precisely, this server 30 is a server SM-DP+, responsible for preparing the subscription management data. The server 30 comprises in particular:
- a processor 300 for executing code instructions of software modules;
- a memory area 305, designed to store an application which comprises code instructions for implementing the steps of the method for obtaining an access profile;
- a storage memory, not represented, designed to store data used during the implementation of the obtaining method;
- a communication module 301, designed to communicate with security modules and with servers of an operator;
- a reception module 303, designed to receive a request for obtaining an access profile in association with a subscription with an operator originating from a first security module 21 associated with a first user device 11, the subscription comprising at least one second user device 10 with which a second security module 20 is associated, the second security module having obtained an access profile for accessing the network in conjunction with said subscription, the request being addressed to the contact address of the server and comprising a datum allowing said server to interrogate a control server 40 so as to obtain an order for downloading of the access profile and being addressed to a contact address of the server, the contact address and said datum having been received by the first user device in a message sent by the second user device;
- an interrogation module 302, designed to interrogate the control server so as to obtain an order for downloading of the access profile into the first security module;
- a downloading module 304, designed to download the access profile into the first security module on obtaining of an order originating from the control server, a confirmation being sent by the first user device to the second user device once the profile has been downloaded.

It is underscored here that the server 30 also comprises other processing modules, not represented in FIG. 4, designed to implement the various server SM-DP+ functions.

The technique for obtaining an access profile is implemented by means of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for the execution of firmware, etc.

In a particular embodiment, the modules 103, 104 are designed to implement the obtaining method described above. This preferably involves software modules comprising software instructions for executing those of the steps of the method for obtaining an access profile described above, that are implemented by a user device. The invention therefore also relates to:
- a program for a user device, comprising program code instructions intended to control the execution of the steps of the method for obtaining an access profile described above, when said program is executed by this device;
- a recording medium readable by a device on which the program for a device is recorded.

In a particular embodiment, the modules 302, 303, 304 are designed to implement the obtaining method described above. This preferably involves software modules comprising software instructions for executing those of the steps of the method for obtaining an access profile described above that are implemented by a server. The invention therefore also relates to:
- a program for a server, comprising program code instructions intended to control the execution of the steps of the method for obtaining an access profile described above, when said program is executed by this server;
- a recording medium readable by a server on which the program for a server is recorded.

The software modules may be stored in or transmitted by a data medium. This may be a hardware storage medium, for example a CD-ROM, a magnetic floppy disk or a hard disk, or else a transmission medium such as an electrical, optical or radio signal, or a telecommunication network.

The invention relates furthermore to a system 1 comprising a first user device 10 and a server 30 which is configured to provide by downloading an access profile such as are described above. This system furthermore comprises a second user device 11 with which a second security module 21 is associated, forming a second terminal comprising:
- a communication module, designed to receive from the first user device a message comprising a contact address of a server 30 configured to provide by downloading an access profile and a datum allowing the server to interrogate a control server 40 so as to obtain an order for downloading of an access profile for the second security module;
- a profile-obtaining module, designed to send a request for obtaining an access profile in association with a subscription with an operator, the subscription comprising at least the first user device 10 with which the first security module 20 is associated, the request being addressed to the contact address of the server and comprising said datum, and to download the access profile into the second security module;

said communication module furthermore being designed to send to the first user device a confirmation of downloading of the access profile into the second security module.

Although the present disclosure has been described with reference to one or more examples, workers skilled in the art will recognize that changes may be made in form and detail without departing from the scope of the disclosure and/or the appended claims.

The invention claimed is:

1. A method for obtaining a first access profile for accessing a network for a first security module associated with a first user device, said method comprising:
for a second user device with which a second security module is associated, the second security module having obtained a second access profile for accessing the network in conjunction with a subscription with an operator:
on receipt of a command for associating the first user device with said subscription, sending by the second user device to the first user device, a message comprising a contact address of a server configured to provide by downloading said first access profile and a datum allowing the server to interrogate a control server so as to obtain an order for downloading of the first access profile,
said message being intended to trigger a sending by said first security module of a request for obtaining said first access profile in association with said subscription, the request being addressed to the contact address of the server and comprising said datum allowing said server to interrogate the control server; and
receiving by the second user device from the first user device of a confirmation of downloading of the first access profile into the first security module.

2. The method for obtaining as claimed in claim 1, in which the second user device obtains from the second security module the contact address.

3. The method for obtaining as claimed in claim 1, in which the second user device obtains from the second security module the datum allowing the server to interrogate the control server.

4. The method for obtaining as claimed in claim 1, in which data associated with said first or second access profile comprise the contact address and the datum allowing the server to interrogate the control server.

5. The method for obtaining as claimed in claim 1, in which the sent message furthermore comprises a subscription identifier in respect of a subscription with the operator.

6. A method for obtaining a first access profile for accessing a network for a first security module associated with a first user device, said method comprising:
receiving by a server configured to provide by downloading said first access profile, a request for obtaining said first access profile in association with a subscription with an operator originating from said first security module, the subscription comprising at least one second user device with which a second security module is associated, the second security module having obtained a second access profile for accessing the network in conjunction with said subscription, the request being addressed to the contact address of the server and comprising a datum allowing said server to interrogate a control server so as to obtain an order for downloading of the first access profile;
as a function of the datum received, interrogating the control server so as to obtain an order for downloading of the first access profile into the first security module; and
on obtaining of said order, downloading the first access profile into the first security module, a confirmation being sent by the first user device to the second user device once the first access profile has been downloaded.

7. A user device, so-called second user device, with which is associated a security module, so-called second security module, said second device comprising:
a processor; and
a non-transitory computer-readable medium comprising instructions stored thereon, which when executed by the processor configure the user device to perform acts comprising:
receiving a command for associating a first user device with a subscription with an operator comprising at least said second user device, the second security module having obtained second access profile for accessing the network in conjunction with said subscription;

sending to the first user device a message comprising a contact address of a server configured to provide by downloading a first access profile for accessing the network and a datum allowing the server to interrogate a control server so as to obtain an order for downloading of the first access profile for a first security module associated with the first device, said message being intended to trigger a sending by said first security module of a request for obtaining the first access profile in association with said subscription, the request being addressed to the contact address of the server and comprising said datum allowing said server to interrogate the control server;

receiving from the first user device a confirmation of downloading of the first access profile into the first security module.

8. A server configured to provide by downloading an access profile, said server comprising:

a processor; and a non-transitory computer-readable medium comprising instructions stored thereon, which when executed by the processor configure the user device to perform acts comprising:

receiving a request for obtaining a first access profile for accessing a network in association with a subscription with an operator originating from a first security module associated with a first user device, the subscription comprising at least one second user device with which a second security module is associated, the second security module having obtained a second access profile for accessing the network in conjunction with said subscription, the request being addressed to the contact address of the server and comprising a datum allowing said server to interrogate a control server so as to obtain an order for downloading of the first access profile;

as a function of the datum received, interrogating the control server so as to obtain an order for downloading of the first access profile into the first security module; and downloading the first access profile into the first security module on obtaining of an order originating from the control server, a confirmation being sent by the first user device to the second user device once the first access profile has been downloaded.

9. A non-transitory recording medium readable by a second user device and on which a program is recorded, the program comprising instructions which when executed by a processor of the second user device configure the second user device to obtain a first access profile for accessing a network for a first security module associated with a first user device, the second user device being associated with a second security module, the second security module having obtained second access profile for accessing the network in conjunction with a subscription with an operator, wherein the instructions configure the second user device to:

on receipt of a command for associating the first user device with said subscription, send by the second user device to the first user device, a message comprising a contact address of a server configured to provide by downloading the first access profile and a datum allowing the server to interrogate a control server so as to obtain an order for downloading of the first access profile, said message being intended to trigger a sending by said first security module of a request for obtaining the first access profile in association with said subscription, the request being addressed to the contact address of the server and comprising said datum allowing said server to interrogate the control server; and receive by the second user device from the first user device of a confirmation of downloading of the first access profile into the first security module.

10. A non-transitory recording medium readable by a server and on which a program is recorded-, the program comprising instructions which when executed by a processor of the server configure the server to obtain a first access profile for accessing a network for a first security module associated with a first user device, wherein the instructions configure the server to:

receive a request for obtaining the first access profile in association with a subscription with an operator originating from said first security module, the subscription comprising at least one second user device with which a second security module is associated, the second security module having obtained a second access profile for accessing the network in conjunction with said subscription, the request being addressed to the contact address of the server and comprising a datum allowing said server to interrogate a control server so as to obtain an order for downloading of the first access profile;

as a function of the datum received, interrogating the control server so as to obtain an order for downloading of the first access profile into the first security module; and on obtaining of said order, downloading the first access profile into the first security module.

* * * * *